United States Patent
Wang

(10) Patent No.: US 9,557,820 B2
(45) Date of Patent: Jan. 31, 2017

(54) METHODS AND SYSTEMS FOR COMMENCING A PROCESS BASED ON MOTION DETECTION

(71) Applicant: Noodoe Corporation, Taipei (TW)

(72) Inventor: John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 0 days.

(21) Appl. No.: 14/599,606

(22) Filed: Jan. 19, 2015

(65) Prior Publication Data

US 2015/0234473 A1    Aug. 20, 2015

(30) Foreign Application Priority Data

Feb. 17, 2014    (TW) .............................. 103105045 A

(51) Int. Cl.
| | |
|---|---|
| *G06F 3/02* | (2006.01) |
| *G06F 3/01* | (2006.01) |
| *H04W 12/06* | (2009.01) |
| *H04L 29/06* | (2006.01) |

(52) U.S. Cl.
CPC ............. *G06F 3/017* (2013.01); *H04L 63/083* (2013.01); *H04W 12/06* (2013.01)

(58) Field of Classification Search
CPC .... G06F 3/014; G06F 3/016; G06F 2203/013; G06F 2203/014; G06F 3/017; G06F 3/0346; G06F 2200/1637; G06F 1/1662; G06F 3/02; G06F 3/04847; H04L 63/083; H04W 12/06

See application file for complete search history.

(56) References Cited

U.S. PATENT DOCUMENTS

| | | | | |
|---|---|---|---|---|
| 7,253,800 | B2 * | 8/2007 | Goldberg ................ | G06F 3/002 345/156 |
| 2001/0047488 | A1 * | 11/2001 | Verplaetse .............. | G06F 21/32 726/5 |
| 2005/0210417 | A1 | 9/2005 | Marvit et al. | |
| 2006/0265325 | A1 | 11/2006 | Fajardo | |
| 2010/0234077 | A1 * | 9/2010 | Yoo ........................ | G06F 1/1626 455/566 |
| 2011/0162066 | A1 * | 6/2011 | Kim ........................ | G06F 3/017 726/18 |

(Continued)

FOREIGN PATENT DOCUMENTS

| | | |
|---|---|---|
| EP | 2597590 A2 | 5/2013 |
| EP | 2631834 A1 | 8/2013 |

(Continued)

*Primary Examiner* — Lun-Yi Lao
*Assistant Examiner* — Jarurat Suteerawongsa
(74) *Attorney, Agent, or Firm* — McClure, Qualey & Rodack, LLP

(57) ABSTRACT

Methods and systems for commencing a process based on motion detection are provided. First, a first electronic device obtains an input, and receives motion information from a second electronic device, wherein at least one sensor detects a motion of the second electronic device to generate the motion information. The first electronic device determines whether the motion information conforms to the input. When the motion information conforms to the input, a process on the first electronic device is performed.

15 Claims, 13 Drawing Sheets

(56) References Cited

U.S. PATENT DOCUMENTS

| | | | |
|---|---|---|---|
| 2011/0291925 A1* | 12/2011 | Israel | G06F 3/017 |
| | | | 345/157 |
| 2012/0075439 A1* | 3/2012 | Gong | H04N 5/247 |
| | | | 348/61 |
| 2012/0235926 A1 | 9/2012 | Sip | |
| 2013/0022235 A1 | 1/2013 | Pettit et al. | |
| 2013/0335201 A1 | 12/2013 | Kang et al. | |

FOREIGN PATENT DOCUMENTS

| | | |
|---|---|---|
| TW | 200522687 A | 7/2005 |
| TW | 201239675 A | 10/2012 |
| WO | 2011066381 A2 | 6/2011 |

* cited by examiner

METHODS AND SYSTEMS FOR COMMENCING A PROCESS BASED ON MOTION DETECTION

BACKGROUND OF THE INVENTION

Field of the Invention

The disclosure relates generally to methods and systems for commencing a process based on motion detection, and, more particularly to methods and systems that can perform process managements for an electronic device based on the motion of another electronic device.

Description of the Related Art

Recently, electronic devices, such as smart phones, notebooks, wearable devices, or other portable devices, have become more and more technically advanced and multifunctional. For example, a portable device may have network connecting capabilities. Users can use their portable devices to connect to networks anytime and anywhere. For the convenience and newly functionalities advanced by modern technology, these devices have become necessities of life.

Generally, every electronic device has a security mechanism to avoid being accessed by users other than the owner of the electronic device. The most popular security mechanism uses a password to protect the electronic device. The electronic device typically provides an operational interface for asking users to input a password, such as a combination of characters and numerals, and compares the input password with preset passwords to verify whether the user is authorized to use the electronic device. In addition, an electronic device can receive a track input corresponding to a movement of a finger on a touch-sensitive device. Similarly, the electronic device compares the track input with preset data, and determines whether to allow the user to access the electronic device based on the comparison result.

More recently, biometric authentication technology, such as fingerprint, retina or iris recognition has started to be adopted as the security mechanism for electronic devices. Since biometric authentication technology recognizes users according to exclusive physiological and/or behavior characteristics of the respective users, the security of electronic devices are elevated to a much higher level. However, in all of the above security mechanisms, users must perform a preliminary setup procedure. For example, users must input related data, such as password, track input or biometric characteristic to the electronic device in advance, so that the data can be used for subsequent comparison. These behaviors need extra effort of users. Since the electronic device needs a processing time for performing the security mechanism based on respective authentication data, users must wait for a longer time when the security level is higher. Additionally, regardless of how unique the data is, the data is still at risk of leaking out or being imitated.

BRIEF SUMMARY OF THE INVENTION

Methods and systems for commencing a process based on motion detection are provided, wherein process managements for an electronic device can be performed based on the motion of another electronic device.

In an embodiment of a method for commencing a process based on motion detection, a first electronic device obtains an input, and receives motion information from a second electronic device, wherein at least one first sensor detects a motion of the second electronic device to generate the motion information. The first electronic device determines whether the motion information conforms to the input. When the motion information conforms to the input, a process on the first electronic device is performed.

An embodiment of a system for commencing a process based on motion detection for use in a first electronic device comprise an input obtaining unit, a reception unit, and a processing unit. The input obtaining unit obtains an input. The reception unit receives motion information from a second electronic device, wherein at least one first sensor detects a motion of the second electronic device to generate the motion information. The processing unit determines whether the motion information conforms to the input. When the motion information conforms to the input, the processing unit performs a process on the first electronic device.

In some embodiments, the input is a track corresponding to a movement of an object on an input unit of the first electronic device, the input is a track detected by an input unit of the first electronic device, the input is a trigger of an event in the first electronic device, or the input is a trigger of at least one input unit of the first electronic device.

In some embodiments, a motion of the first electronic device is detected by at least one sensor to generate the input.

In some embodiments, it is determined whether a time difference between a time when the input is received and a time when the motion information is received is less than a predefined value. When the time difference is less than the predefined value, the process on the first electronic device is performed.

In some embodiments, it is determined whether the received input conforms to a predefined pattern in the first electronic device. When the received input conforms to the predefined pattern in the first electronic device, the process on the first electronic device is performed.

In some embodiments, it is determined whether identification data corresponding to the second electronic device conforms to predefined identification data in the first electronic device. When the identification data corresponding to the second electronic device conforms to the predefined identification data in the first electronic device, the connection from the second electronic device is accepted, and the motion information is received from the second electronic device.

In some embodiments, the motion information comprises a variation of a velocity, a displacement, and/or an angular acceleration generated in a predefined interval in which the motion of the second electronic device occurred.

In some embodiments, the process comprises an unlocking process for the first electronic device, an operational process for a user interface in the first electronic device, and/or an activation process for an application in the first electronic device.

Methods for commencing a process based on motion detection may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for commencing a process based on motion detection are provided.

Figure 1:
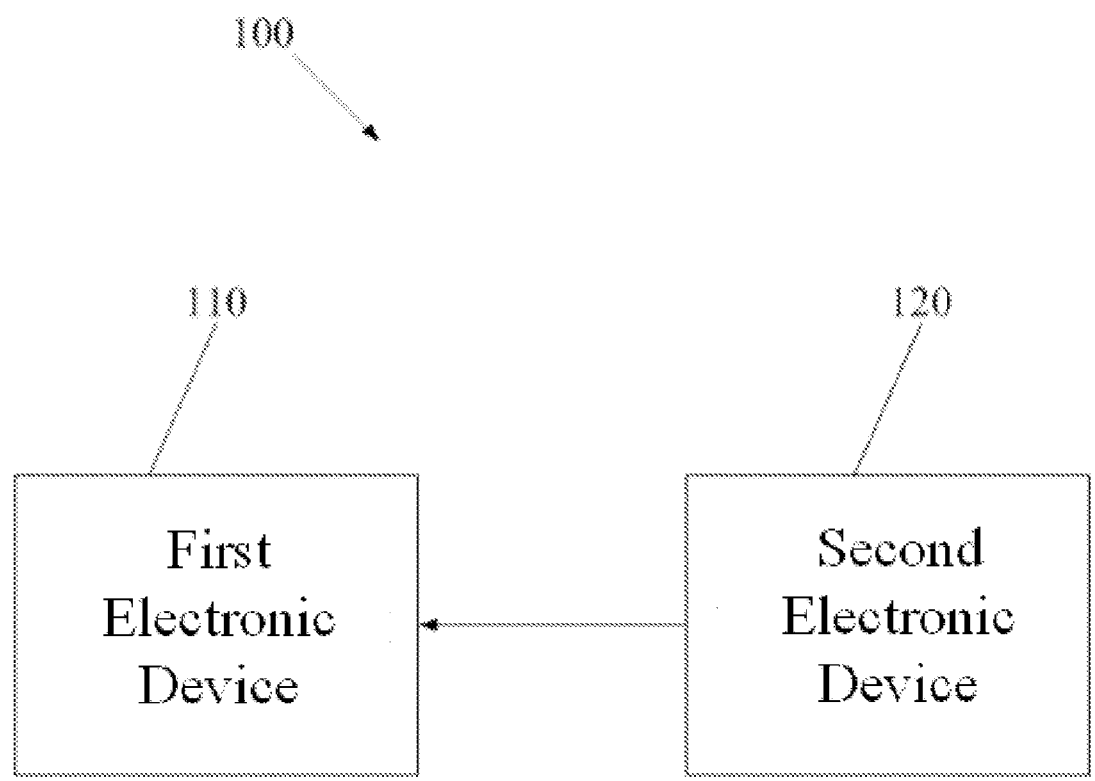
FIG. 1 is a schematic diagram illustrating an embodiment of a system for commencing a process based on motion detection of the invention.

FIG. 1 is a schematic diagram illustrating an embodiment of a system for commencing a process based on motion detection of the invention. As shown in FIG. 1, the system for commencing a process based on motion detection 100 comprises a first electronic device 110 and a second electronic device 120. In some embodiments, the first electronic device 110 may be a computer, or a portable device, such as a mobile phone, a smart phone, a PDA (Personal Digital Assistant), a GPS (Global Positioning System), a notebook, a tablet computer, or a wearable device. Similarly, the second electronic device 120 may be a computer, or a portable device, such as a mobile phone, a smart phone, a PDA, a GPS, a notebook, a tablet computer, or a wearable device. The second electronic device 120 can couple to the first electronic device 110, and transmit related information to the first electronic device 110. The first electronic device 110 can perform the methods for commencing a process based on motion detection of the invention according to the information received from the second electronic device 120, which will be discussed later.

Figure 2:
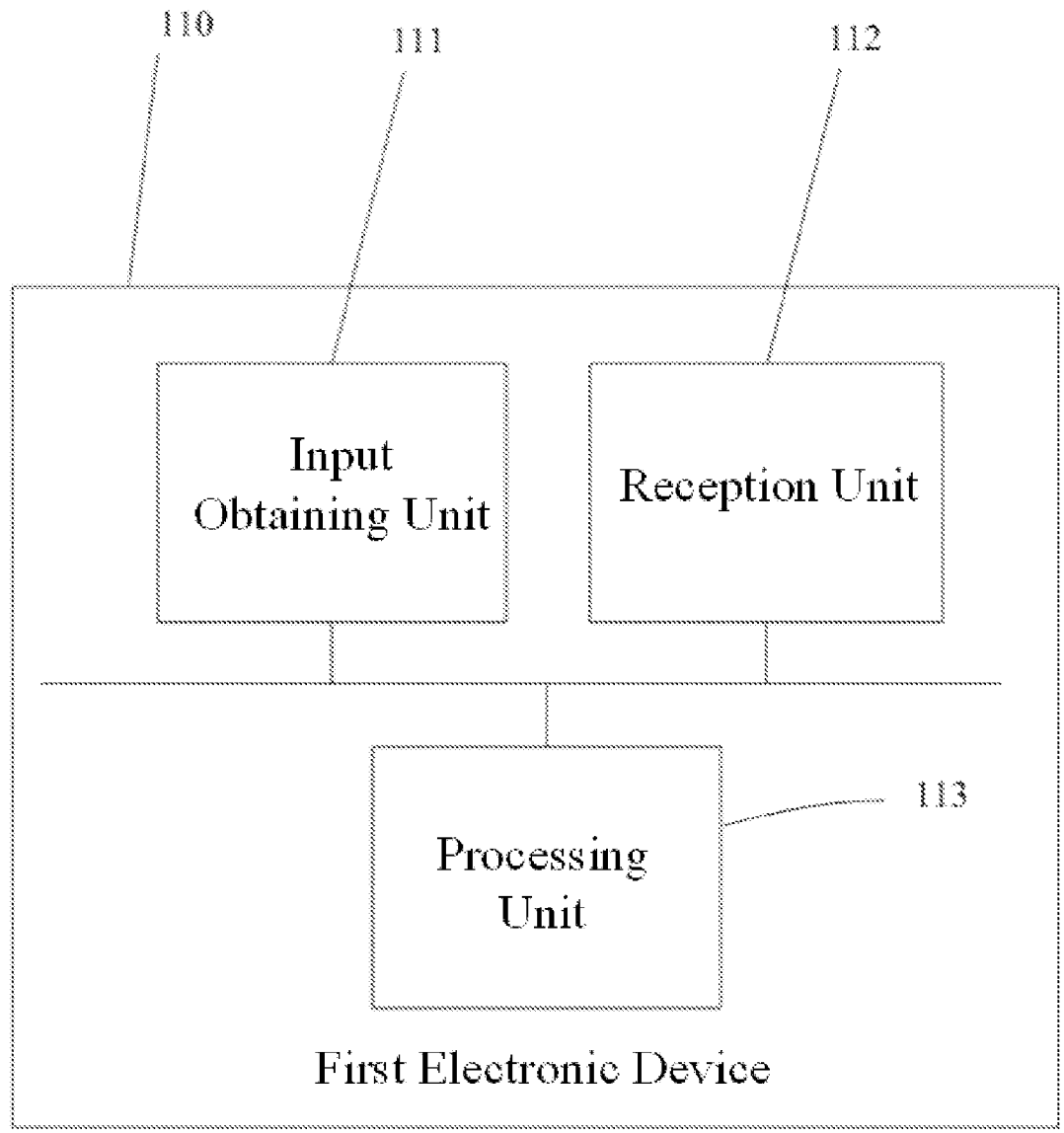
FIG. 2 is a schematic diagram illustrating an embodiment of a first electronic device of the invention.

FIG. 2 is a schematic diagram illustrating an embodiment of a first electronic device of the invention. As described, the first electronic device 110 may be a computer, or a portable device, such as a mobile phone, a smart phone, a PDA, a GPS, a notebook, a tablet computer, or a wearable device. The first electronic device 110 can comprise an input obtaining unit 111, a reception unit 112, and a processing unit 113. The input obtaining unit 111 can obtain an input directed towards the first electronic device 110. It is understood that, in some embodiments, the first electronic device 110 can comprise an input unit (not shown in FIG. 2), such as a touch-sensitive unit, a touch-sensitive screen, a physical button, a pointing device such as a mouse, a ultrasonic sensor, a radar or a camera. In some embodiments, the input obtained by the input obtaining unit 111 may be a track corresponding to a movement of an object such as a finger on the input unit of the first electronic device 110. In some embodiments, the input obtained by the input obtaining unit 111 may be a track detected by the input unit of the first electronic device 110. In some embodiments, the input obtained by the input obtaining unit 111 may be a trigger of at least one input unit of the first electronic device 110. In some embodiments, the input obtained by the input obtaining unit 111 may be a trigger of an event in the first electronic device 110. Further, in some embodiments, the first electronic device 110 can comprise at least one sensor for detecting a motion of the first electronic device 110. In some embodiments, the sensor detects a motion of the first electronic device 110, and generates the input to the input obtaining unit 111. It is noted that, in some embodiments, the sensor may be an accelerometer, such as a G-sensor for generating information of velocity and displacement when the electronic device moves. In some embodiments, the sensor may be a Gyro sensor for generating information of angular acceleration when the electronic device moves. It is noted that, the above sensors are only examples of the present invention, and the present invention is not limited thereto. Any sensor which can detect the motion of an electronic device can be applied in the present invention. It is understood that, in some embodiments, the input obtaining unit 111 and the input unit can be integrated as one unit. The reception unit 112 can receive related information from the second electronic device 120. It is understood that, in some embodiments, the reception unit 112 can have network connecting capabilities for coupling with other electronic devices having network connecting capabilities via a network, such as a wired network or a wireless network such as Bluetooth or Wi-Fi network. The processing unit 113 can control related operations of hardware and software in the first electronic device 110, and perform the methods for commencing a process based on motion detection of the invention, which will be discussed in the following paragraphs.

Figure 3:
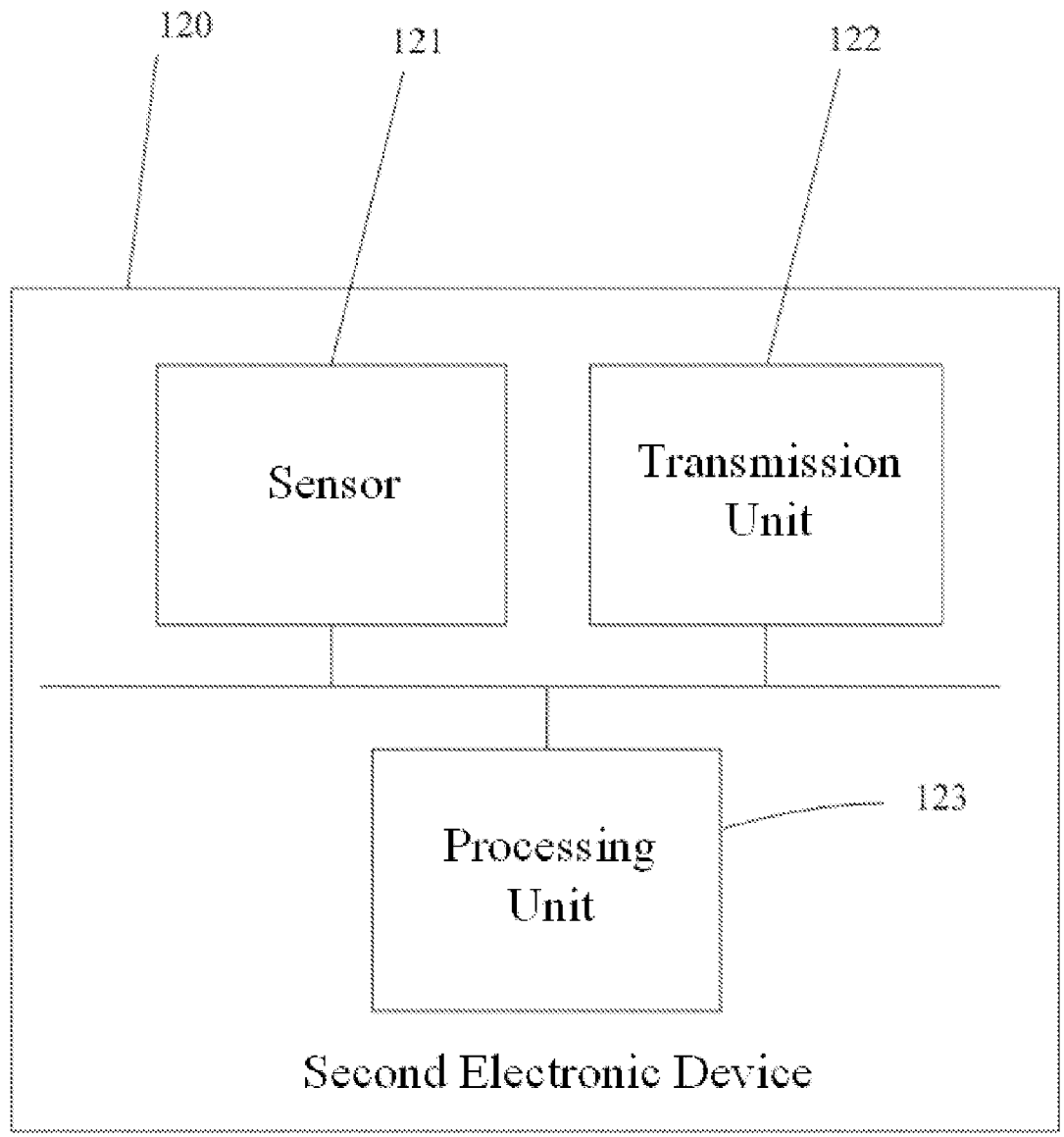
FIG. 3 is a schematic diagram illustrating an embodiment of a second electronic device of the invention.

FIG. 3 is a schematic diagram illustrating an embodiment of a second electronic device of the invention. As described, the second electronic device 120 may be a computer, or a portable device, such as a mobile phone, a smart phone, a PDA, a GPS, a notebook, a tablet computer, or a wearable device. The second electronic device 120 can comprise at least one sensor 121, a transmission unit 122, and a processing unit 123. The sensor 121 can detect a motion of the second electronic device 120 to generate the motion information. Similarly, in some embodiments, the sensor may be an accelerometer for generating information of velocity and displacement when the electronic device moves. In some embodiments, the sensor may be a Gyro sensor for generating information of angular acceleration when the electronic device moves. It is noted that, the above sensors are only examples of the present invention, and the present invention is not limited thereto. Any sensor which can detect the motion of an electronic device can be applied in the present invention. It is understood that, in some embodiments, the motion information may be a variation of a velocity, a displacement, and/or an angular acceleration generated in a predefined interval in which the motion of the second electronic device 120 occurred. The transmission unit 122 can transmit the motion information corresponding to the second electronic device 120 to the first electronic device 110. It is understood that, in some embodiments, the transmission unit 122 can have network connecting capabilities for coupling with other electronic devices having network connecting capabilities via a network, such as a wired network or a wireless network such as Bluetooth or Wi-Fi network. The processing unit 123 can control related operations of hardware and software in the second electronic device 120.

Figure 4:
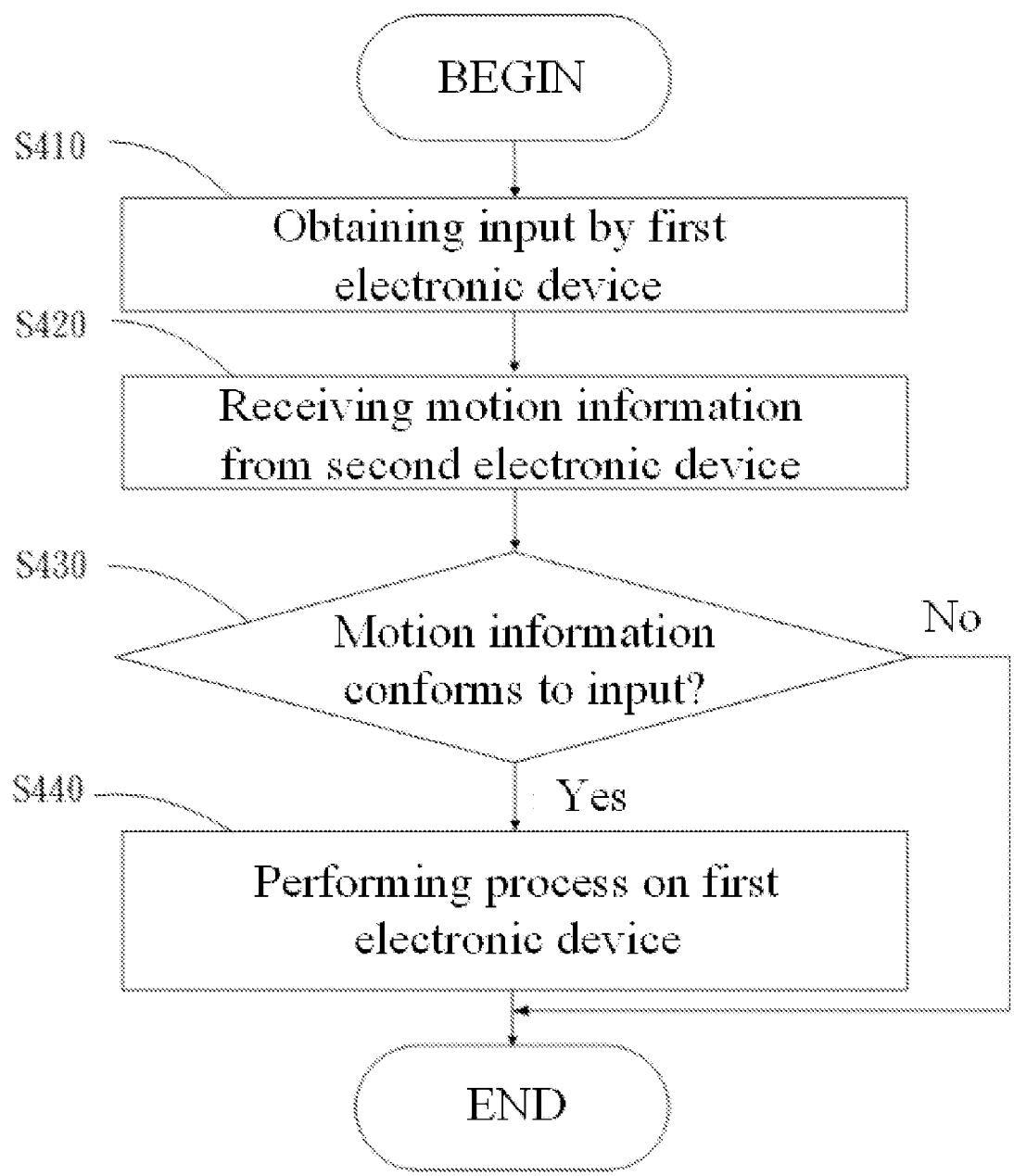
FIG. 4 is a flowchart of an embodiment of a method for commencing a process based on motion detection of the invention.

FIG. 4 is a flowchart of an embodiment of a method for commencing a process based on motion detection of the invention.

In step S410, a first electronic device obtains an input. It is noted that, in some embodiments, the input may be a track corresponding to a movement of an object such as a finger on an input unit, such as a touch-sensitive unit or a touch-sensitive screen of the first electronic device. In some embodiments, the input may be a trigger of at least one input unit, such as a physical button or a pointing device such as mouse of the first electronic device. In some embodiments, the input may be a track detected by the input unit, such as an ultrasonic sensor, a radar or a camera of the first electronic device.

In some embodiments, the input may be a trigger of an event in the first electronic device. In some embodiments, the input may be data output by at least one sensor. The sensor can detect a motion of the first electronic device to generate the input. It is noted that, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the first electronic device occurred can be recorded. It is noted that, the above sensors are only examples of the present invention, and the present invention is not limited thereto. Any sensor which can detect the motion of an electronic device can be applied in the present invention. In step S420, motion information is received from a second electronic device. It is noted that, the first electronic device receives the motion information from the second electronic device via a network, such as a wired network or a wireless network such as Bluetooth or Wi-Fi network. It is noted that, the second electronic device has at least one sensor for detecting a motion of the second electronic device to generate the motion information. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the second electronic device occurred can be recorded as the motion information. It is noted that, the above sensors are only examples of the present invention, and the present invention is not limited thereto. Any sensor which can detect the motion of an electronic device can be applied in the present invention.

In step S430, the first electronic device determines whether the motion information conforms to the input. It is understood that, in some embodiments, the first electronic device can directly determine whether the motion information and the input are substantially identical. For example, it is determined whether the motion of the first electronic device detected by the sensor and the motion of the second electronic device detected by the sensor are identical. In some embodiments, it is determined whether a track detected by the first electronic device and a movement tracking in space corresponding to the motion of the second electronic device detected by the sensor are identical. Additionally, in some embodiments, an association setting between the input for the first electronic device and the motion of the second electronic device can be preset in the first electronic device. For example, the association setting can be defined as the input for the first electronic device as pressing at least a specific key, and the motion of the second electronic device is a motion in which the electronic device moves up and down. In another example, the association setting can be defined as the input for the first electronic device as occurring a specific event, and the motion of the second electronic device is a motion in which the electronic device moves left and right, The motion information of the second electronic device conforms to the input of the first electronic device when the items set in the association setting are present. If the motion information of the second electronic device does not conform to the input of the first electronic device (No in step S430), the procedure is completed. If the motion information of the second electronic device conforms to the input of the first electronic device (Yes in step S430), in step S440, a process on the first electronic device is performed. It is understood that, in some embodiments, the process may be an unlocking process for the first electronic device. In some embodiments, the process may be an operational process for a user interface in the first electronic device. In some embodiments, the process may be an activation process for an application in the first electronic device. It is understood that, the above processes are only examples of the present invention, and the present invention is not limited thereto.

Figure 5:
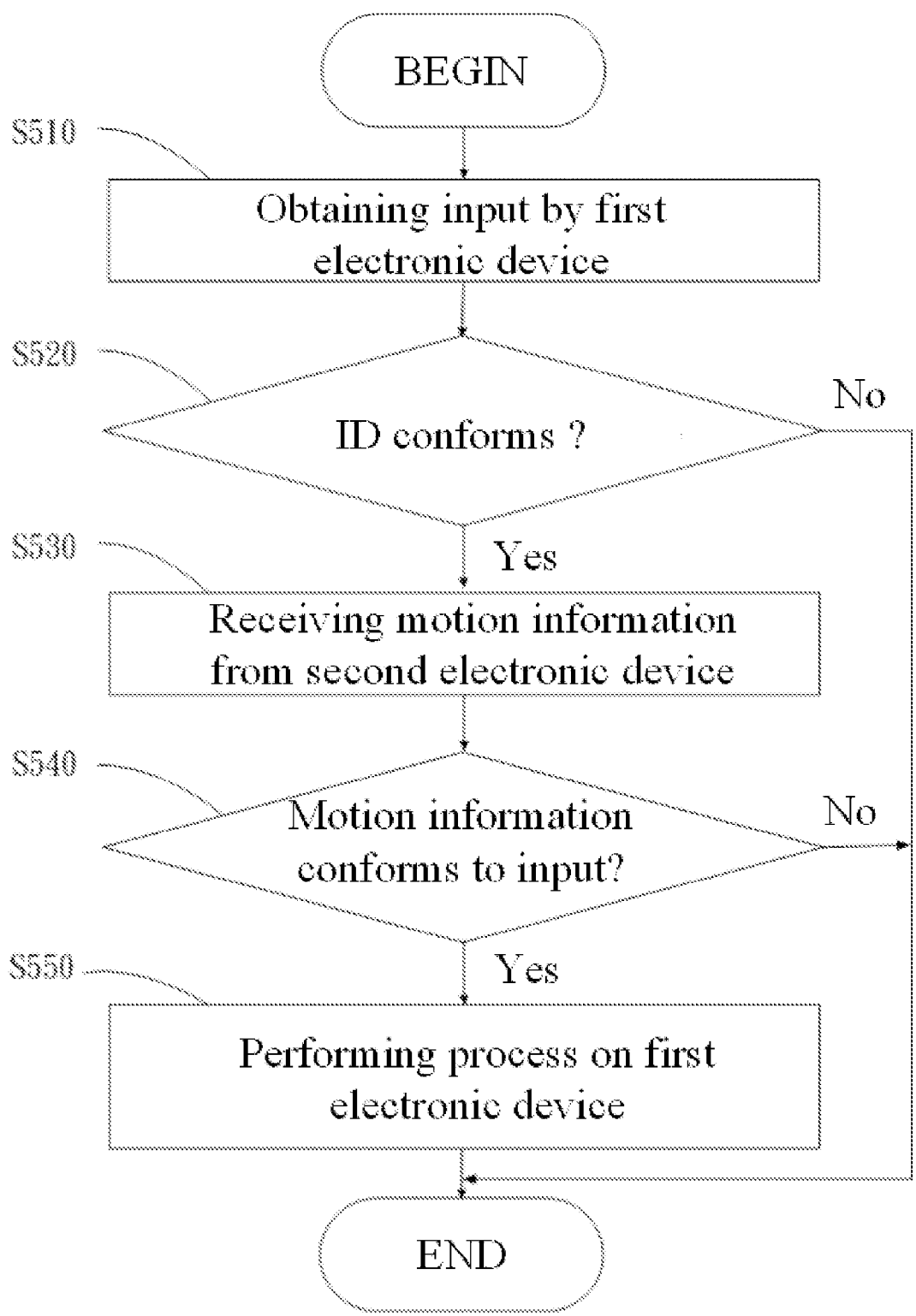
FIG. 5 is a flowchart of another embodiment of a method for commencing a process based on motion detection of the invention.

FIG. 5 is a flowchart of another embodiment of a method for commencing a process based on motion detection of the invention.

In step S510, a first electronic device obtains an input. Similarly, in some embodiments, the input may be a track corresponding to a movement of an object such as a finger on an input unit, such as a touch-sensitive unit or a touch-sensitive screen of the first electronic device. In some embodiments, the input may be a trigger of at least one input unit, such as a physical button or a pointing device such as mouse of the first electronic device. In some embodiments, the input may be a track detected by the input unit, such as a ultrasonic sensor, a radar or a camera of the first electronic device. In some embodiments, the input may be a trigger of an event in the first electronic device. In some embodiments, the input may be data output by at least one sensor. The sensor can detect a motion of the first electronic device to generate the input. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the first electronic device occurred can be recorded. It is noted that, the above sensors are only examples of the present invention, and the present invention is not limited thereto. Any sensor which can detect the motion of an electronic device can be applied in the present invention. In step S520, it is determined whether identification data corresponding to the second electronic device conforms to predefined identification data in the first electronic device. It is noted that, the first electronic device can record the identification data corresponding to the electronic devices which are allowed to couple with the first electronic device. If the identification data corresponding to the second electronic device does not conform to the predefined identification data in the first electronic device (No in step S520), the procedure is completed. If the identification data corresponding to the second electronic device conforms to the predefined identification data in the first electronic device (Yes in step S520), in step S530, the connection from the second electronic device is accepted, and motion information is received from the second electronic device. It is noted that, the first electronic device receives the motion information from the second electronic device via a network, such as a wired network or a wireless network such as Bluetooth or Wi-Fi network. Similarly, the second electronic device has at least one sensor for detecting a motion of the second electronic device to generate the motion information. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the second electronic device occurred can be recorded as the motion information. It is noted that, the above sensors are only examples of the present invention, and the present invention is not limited thereto. Any sensor which can detect the motion of an electronic device can be applied in the present invention.

In step S540, the first electronic device determines whether the motion information conforms to the input. Similarly, in some embodiments, the first electronic device can directly determine whether the motion information and the input are substantially identical. In some embodiments, it is determined whether a track detected by the first electronic device and a movement tracking in space corresponding to the motion of the second electronic device detected by the sensor are identical. Additionally, in some embodiments, an association setting between the input for the first electronic device and the motion of the second electronic device can be preset in the first electronic device. The motion information of the second electronic device conforms to the input of the first electronic device when the items set in the association setting present. If the motion information of the second electronic device does not conform to the input of the first electronic device (No in step S540), the procedure is completed. If the motion information of the second electronic device conforms to the input of the first electronic device (Yes in step S540), in step S550, a process on the first electronic device is performed. It is understood that, the present invention is not limited to any process.

Figure 6:
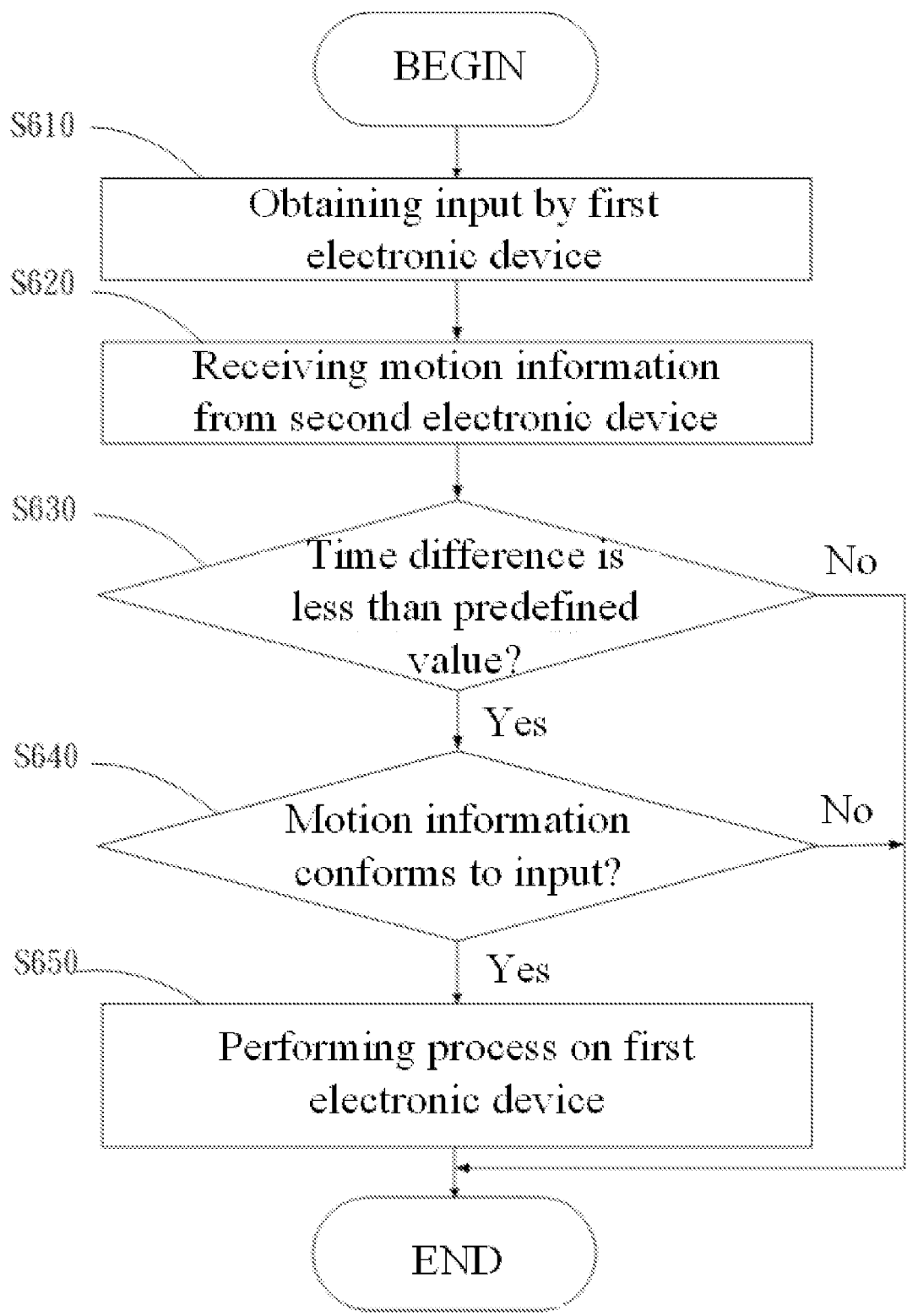
FIG. 6 is a flowchart of another embodiment of a method for commencing a process based on motion detection of the invention.

FIG. 6 is a flowchart of another embodiment of a method for commencing a process based on motion detection of the invention.

In step S610, a first electronic device obtains an input. Similarly, in some embodiments, the input may be a track corresponding to a movement of an object such as a finger on an input unit, such as a touch-sensitive unit or a touch-sensitive screen of the first electronic device. In some embodiments, the input may be a trigger of at least one input unit, such as a physical button or a pointing device such as mouse of the first electronic device. In some embodiments, the input may be a track detected by the input unit, such as a ultrasonic sensor, a radar or a camera of the first electronic device. In some embodiments, the input may be a trigger of an event in the first electronic device. In some embodiments, the input may be data output by at least one sensor. The sensor can detect a motion of the first electronic device to generate the input. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the first electronic device occurred can be recorded. It is noted that, the above sensors are only examples of the present invention, and the present invention is not limited thereto. Any sensor which can detect the motion of an electronic device can be applied in the present invention. In step S620, motion information is received from a second electronic device. It is noted that, the first electronic device receives the motion information from the second electronic device via a network, such as a wired network or a wireless network such as Bluetooth or Wi-Fi network. Similarly, the second electronic device has at least one sensor for detecting a motion of the second electronic device to generate the motion information. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the second electronic device occurred can be recorded as the motion information. It is noted that, the above sensors are only examples of the present invention, and the present invention is not limited thereto. Any sensor which can detect the motion of an electronic device can be applied in the present invention.

In step S630, it is determined whether a time difference between a time when the input is received and a time when the motion information is received is less than a predefined value. If the time difference is not less than the predefined value (No in step S630), the procedure is completed. If the time difference is less than the predefined value (Yes in step S630), in step S640, the first electronic device determines whether the motion information conforms to the input. Similarly, in some embodiments, the first electronic device can directly determine whether the motion information and the input are substantially identical. In some embodiments, it is determined whether a track detected by the first electronic device and a movement tracking in space corresponding to the motion of the second electronic device detected by the sensor are identical. Additionally, in some embodiments, an association setting between the input for the first electronic device and the motion of the second electronic device can be preset in the first electronic device. The motion information of the second electronic device conforms to the input of the first electronic device when the items set in the association setting present. If the motion information of the second electronic device does not conform to the input of the first electronic device (No in step S640), the procedure is completed. If the motion information of the second electronic device conforms to the input of the first electronic device (Yes in step S640), in step S650, a process on the first electronic device is performed. It is understood that, the present invention is not limited to any process.

Figure 7A:
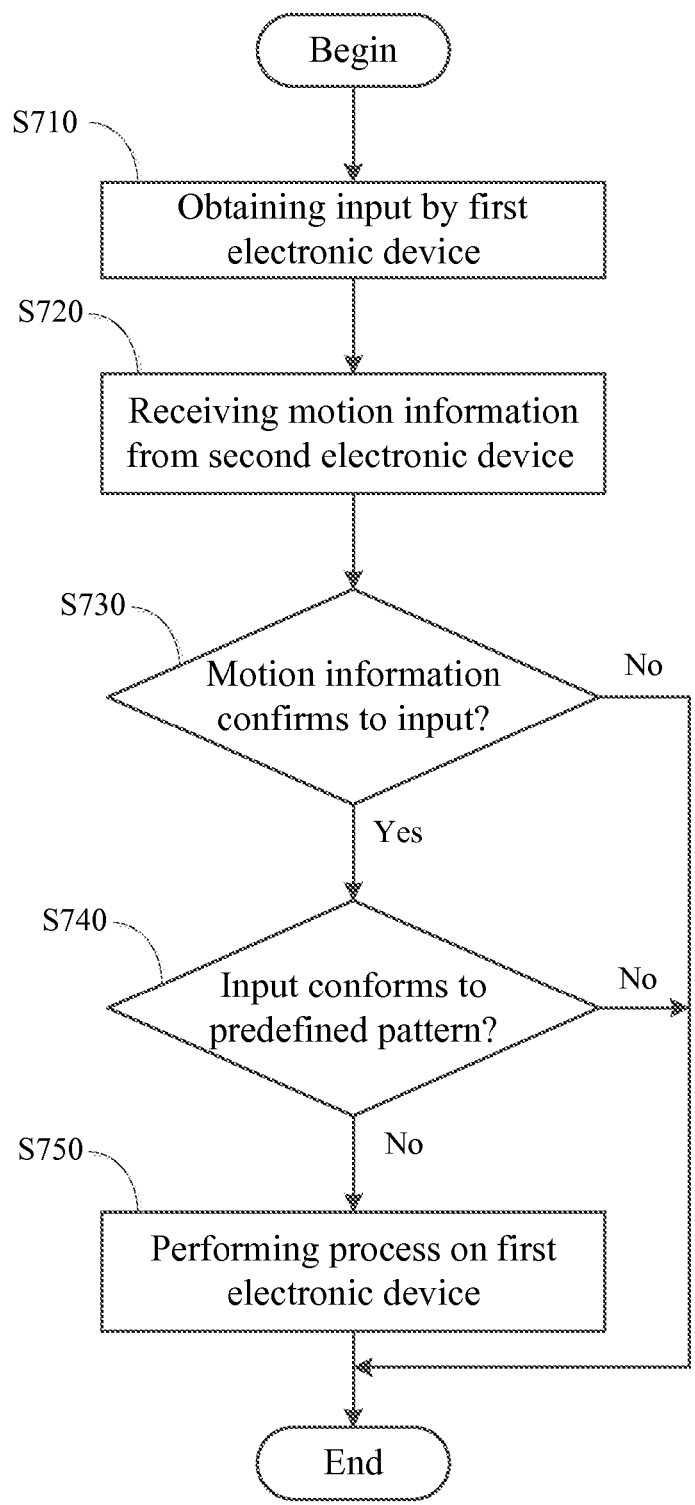
FIG. 7A and FIG. 7B are flowcharts of other embodiments of a method for commencing a process based on motion detection of the invention.
Figure 7B:
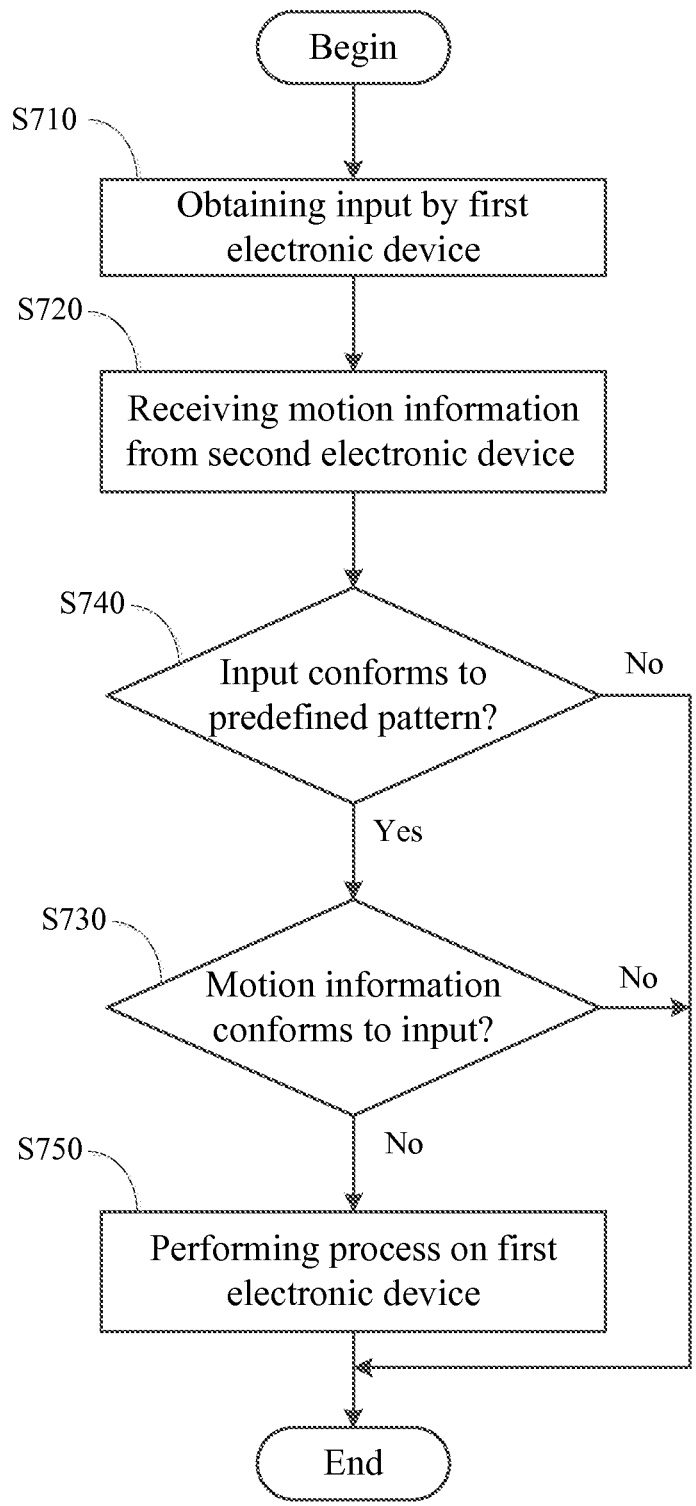

FIG. 7A and FIG. 7B are flowcharts of other embodiments of a method for commencing a process based on motion detection of the invention. FIG. 7B is similar to FIG. 7A, except FIG. 7B shows the order of two of the decision operations reversed.

In step S710, a first electronic device obtains an input. Similarly, in some embodiments, the input may be a track corresponding to a movement of an object such as a finger on an input unit, such as a touch-sensitive unit or a touch-sensitive screen of the first electronic device. In some embodiments, the input may be a trigger of at least one input unit, such as a physical button or a pointing device such as mouse of the first electronic device. In some embodiments, the input may be a track detected by the input unit, such as a ultrasonic sensor, a radar or a camera of the first electronic device. In some embodiments, the input may be a trigger of an event in the first electronic device. In some embodiments, the input may be data output by at least one sensor. The sensor can detect a motion of the first electronic device to generate the input. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the first electronic device occurred can be recorded. It is noted that, the above sensors are only examples of the present invention, and the present invention is not limited thereto. Any sensor which can detect the motion of an electronic device can be applied in the present invention. In step S720, motion information is received from a second electronic device. It is noted that, the first electronic device receives the motion information from the second electronic device via a network, such as a wired network or a wireless network such as Bluetooth or Wi-Fi network. Similarly, the second electronic device has at least one sensor for detecting a motion of the second electronic device to generate the motion information. Similarly, in some embodiments, the sensor may be an accelerometer for generating information of velocity and displacement when the electronic device moves. In some embodiments, the sensor may be a Gyro sensor for generating information of angular acceleration when the electronic device moves. A variation of a velocity, a displacement, and/or an angular acceleration generated in a predefined interval in which the motion of the second electronic device occurred can be recorded as the motion information. It is noted that, the above sensors are only examples of the present invention, and the present invention is not limited thereto. Any sensor which can detect the motion of an electronic device can be applied in the present invention.

In step S730, the first electronic device determines whether the motion information conforms to the input. Similarly, in some embodiments, the first electronic device can directly determine whether the motion information and the input are substantially identical. In some embodiments, it is determined whether a track detected by the first electronic device and a movement tracking in space corresponding to the motion of the second electronic device detected by the sensor are identical. Additionally, in some embodiments, an association setting between the input for the first electronic device and the motion of the second electronic device can be preset in the first electronic device. The motion information of the second electronic device conforms to the input of the first electronic device when the items set in the association setting present. If the motion information of the second electronic device does not conform to the input of the first electronic device (No in step S730), the procedure is completed. If the motion information of the second electronic device conforms to the input of the first electronic device (Yes in step S730), in step S740, it is determined whether the received input conforms to a predefined pattern in the first electronic device. It is noted that, a predefined pattern can be set in the first electronic device. In some embodiments, the predefined pattern may be passwords, a track of movement, a motion, and/or a trigger of a physical button. If the input received by the first electronic device conforms to the predefined pattern, an authentication process of the first electronic device is passed. If the received input does not conform to the predefined pattern in the first electronic device (No in step S740), the procedure is completed. If the received input conforms to the predefined pattern in the first electronic device (Yes in step S740), in step S750, a process on the first electronic device is performed. It is understood that, the present invention is not limited to any process.

It is understood that, in some embodiments, the second electronic device can have personal data, such as password, and the personal data can be transmitted to the first electronic device. The first electronic device can perform a further process according to the personal data.

Figure 8:
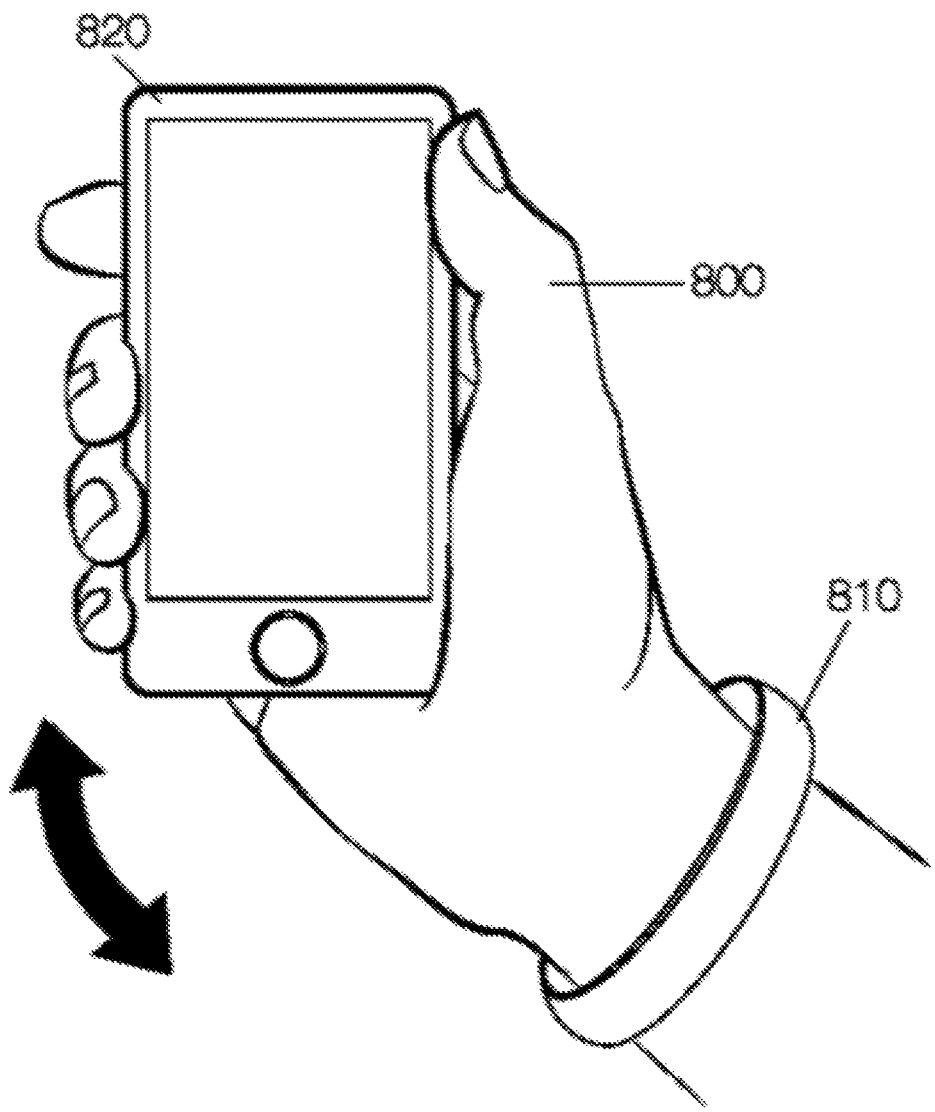
FIGS. 8 to 12 are schematic diagrams illustrating examples of process commencement of the invention
Figure 9:
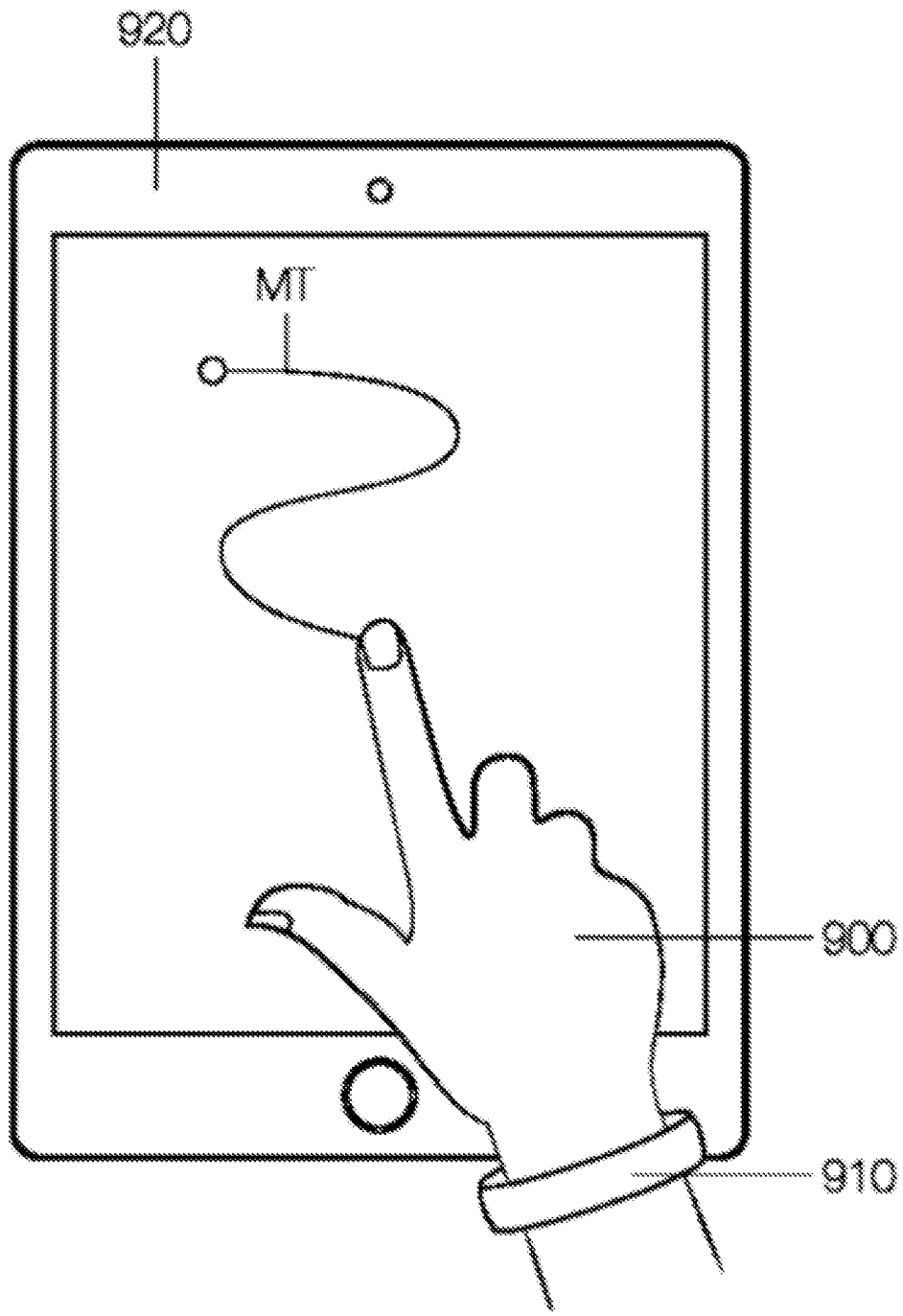
Figure 10:
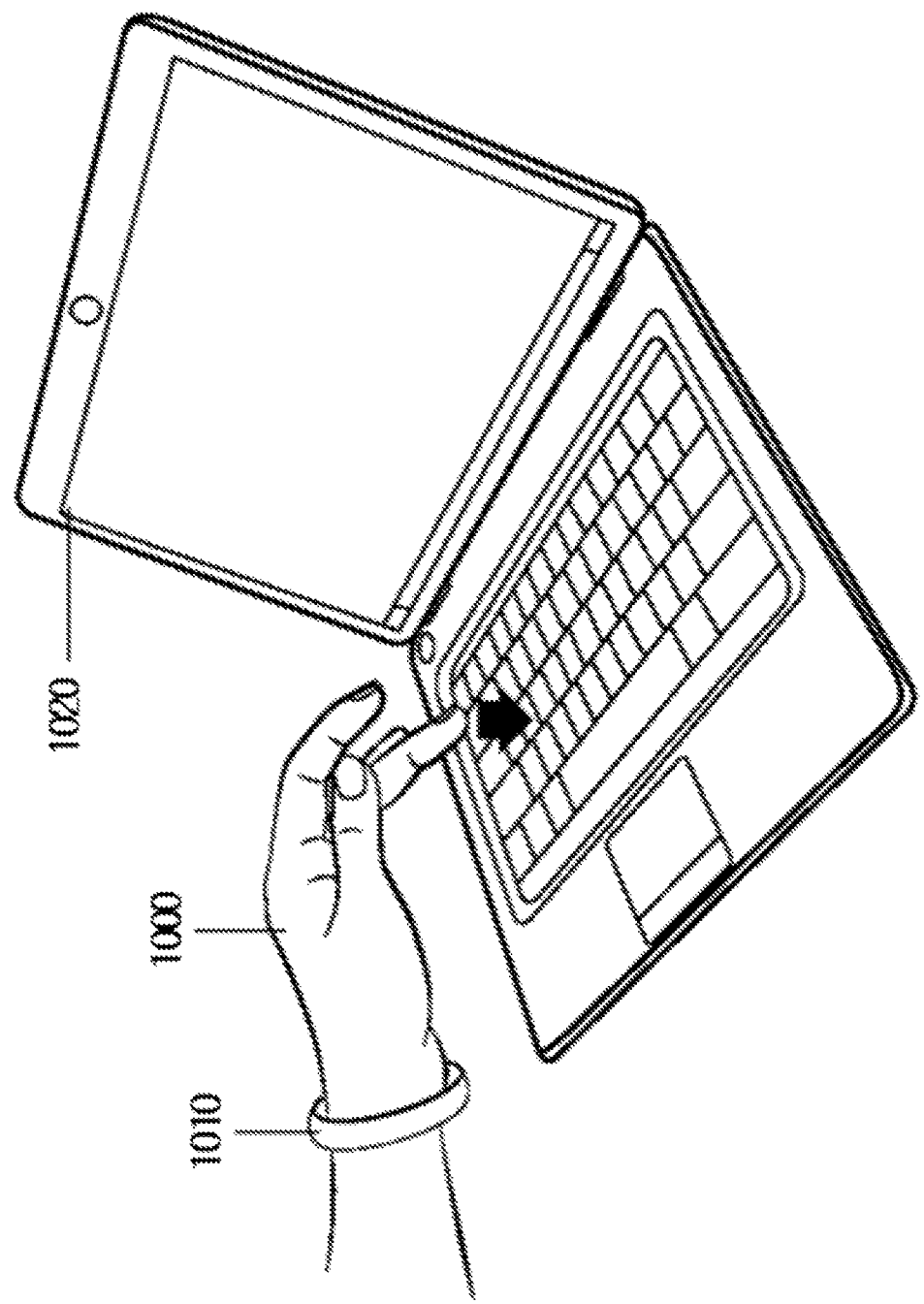

For example, a user can wear a wearable device (second electronic device) 810 equipped with at least one sensor on his/her hand 800, as shown in FIG. 8. When the user wants to unlock a mobile device (first electronic device) 820, such as a smart phone, the user can use the hand 800 wearing the wearable device 810 to hold the mobile device 820, and generate a motion, such as moving up and down. At this time, the wearable device 810 will transmit the detected motion information to the mobile device 820, and the mobile device 820 will compare the motion information received from the wearable device 810 with the motion information (input of the first electronic device) detected by the mobile device 820 itself If the motion information of the wearable device 810 conforms to the motion information of the mobile device 820, the mobile device 820 is unlocked. In this case, other users cannot unlock and operate the mobile device 820 since they do not have the wearable device 810. In another example, a user can wear a wearable device (second electronic device) 910 equipped with at least one sensor on his/her hand 900, as shown in FIG. 9. When the user wants to unlock a tablet (first electronic device) 920, the user can use the hand 900 wearing the wearable device 910 to slide on the touch-sensitive screen, and generate a movement track MT. At this time, the wearable device 910 will transmit the detected motion information to the tablet 920, and the tablet 920 will determine whether the motion information received from the wearable device 910 corresponds to the movement track MT (input of the first electronic device) received by the tablet 920. If the motion information corresponds to the movement track MT, the tablet 920 is unlocked. Similarly, in this case, other users cannot unlock and operate the tablet 920 since they do not have the wearable device 910. In another example, a user can wear a wearable device (second electronic device) 1010 equipped with at least one sensor on his/her hand 1000, as shown in FIG. 10. When the user wants to unlock a notebook (first electronic device) 1020, the user can use the hand 1000 wearing the wearable device 1010 to press at least one key. At this time, the wearable device 1010 will transmit the detected motion information to the notebook 1020, and the notebook 1020 will determine whether the motion information received from the wearable device 1010 corresponds to the trigger of the pressed key received by the notebook 1020. It is noted that, an association setting between the input for the notebook 1020 and the motion of the wearable device 1010 can be preset in the notebook 1020. For example, the association setting can be defined as the input for the notebook 1020 as pressing at least a specific key, and the motion of the wearable device 1010 is a motion in which the electronic device moves up and down. The motion information of the wearable device 1010 corresponds to the input of the notebook 1020 when the items set in the association setting present. If the motion information corresponds to the trigger of the pressed key received by the notebook 1020, the notebook 1020 is unlocked.

Figure 11:
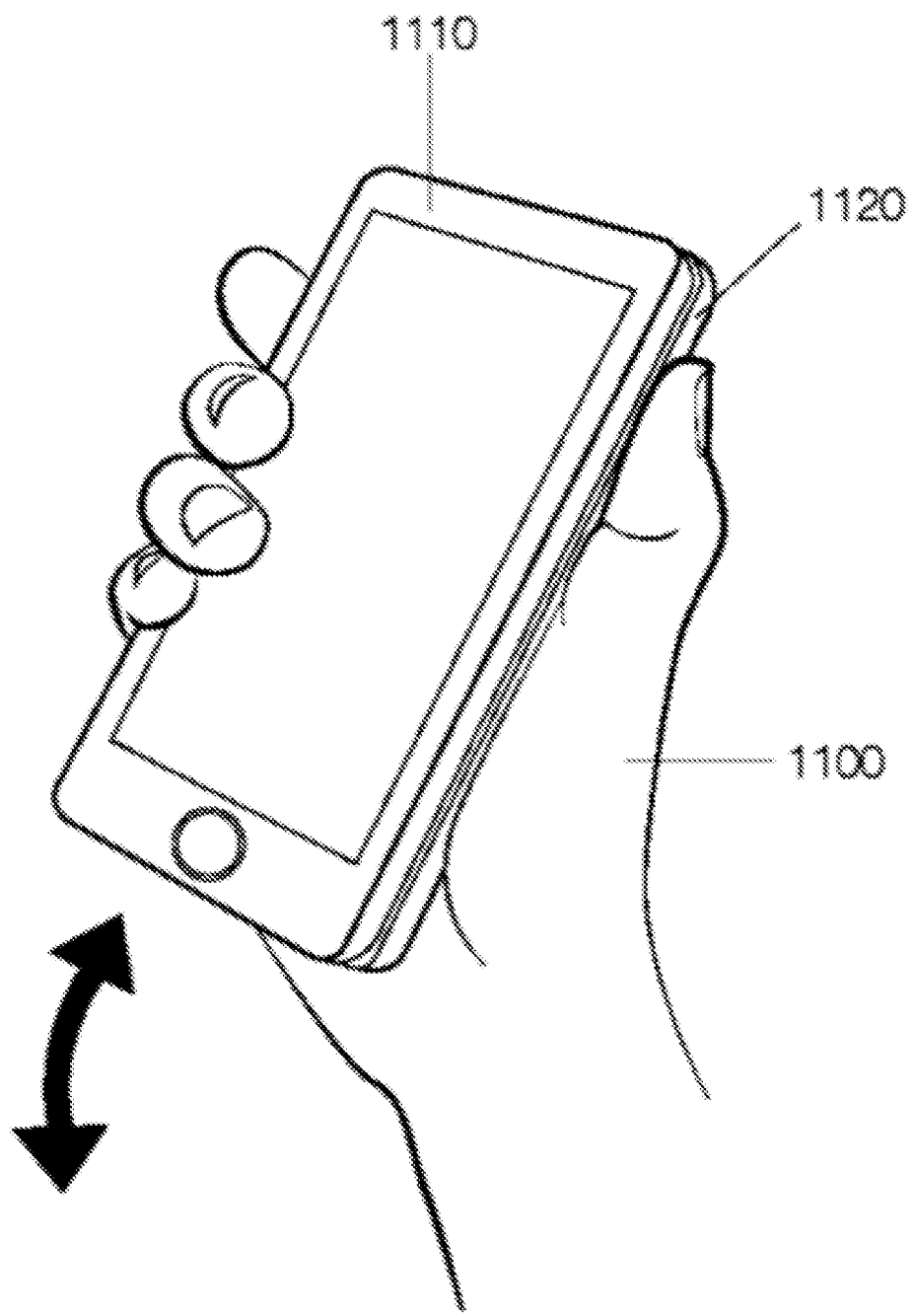
Figure 12:
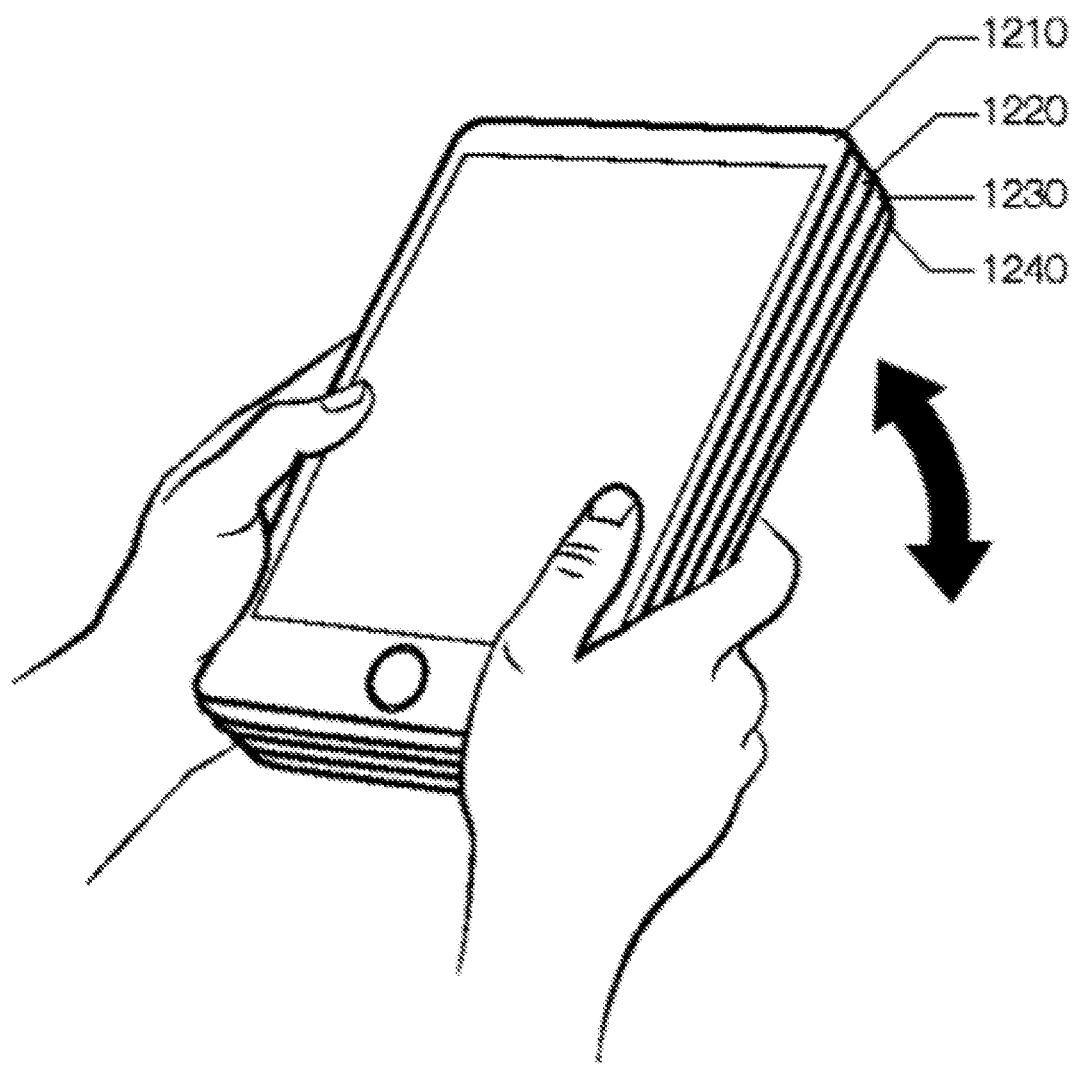

Additionally, in the example of FIG. 11, a user can use his/her hand 1100 to simultaneously hold two mobile devices 1110 and 1120, and generate a motion, such as moving up and down. At this time, the mobile device 1110 (second electronic device) will transmit the detected motion information to the mobile device 1120 (first electronic device), and the mobile device 1120 will compare the motion information received from the mobile device 1110 with the motion information (input of the first electronic device) detected by the mobile device 1120 itself If the motion information of the mobile device 1110 conforms to the motion information of the mobile device 1120, a specific process for the mobile device 1120 is performed. For example, the data, such as business cards in the mobile devices 1110 and 1120 will be exchanged. In the example of FIG. 12, multiple mobile devices (1210, 1220, 1230, 1240) can be simultaneously held by hands, and be moved to generate a motion, such as moving up and down. At this time, the respective mobile device will transmit the detected motion information to at least one of the mobile devices, and the mobile device who receives the motion information from other mobile devices will compare the received motion information with the motion information detected by the mobile device itself If the match conforms, a specific process, such as exchange of business cards between the mobile devices is performed.

Therefore, the methods and systems for commencing a process based on motion detection of the present invention can perform process managements for an electronic device based on the motion of another electronic device, thereby increasing the variety of process managements for electronic devices. In some embodiments, the security of electronic devices can also be raised.

Methods for commencing a process based on motion detection may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for process management based on motion detection for use in a first electronic device, comprising:
   receiving a touch input;
   receiving motion information from a second electronic device, wherein at least one first sensor detects a motion of the second electronic device to generate the motion information;
   determining whether the received touch input conforms to a predefined pattern in the first electronic device;
   determining whether the motion information conforms to the received touch input when the received touch input conforms to the predefined pattern in the first electronic device; and
   when the motion information conforms to the received touch input, performing a process on the first electronic device,
   wherein an association setting between the touch input for the first electronic device and the motion of the second electronic device is preset in the first electronic device, and the determination of whether the motion information conforms to the touch input is performed by looking up a table, and the motion information of the second electronic device conforms to the touch input of the first electronic device when an item set in the association setting is present.

2. The method of claim 1, wherein the touch input comprises a track corresponding to a movement of an object on an input unit of the first electronic device, a track detected by an input unit of the first electronic device, a trigger of at least one input unit of the first electronic device, or a trigger of an event in the first electronic device.

3. The method of claim 1, wherein a motion of the first electronic device is detected by at least one second sensor to generate the touch input.

4. The method of claim 1, further comprising:
   determining whether a time difference between a time when the touch input is received and a time when the motion information is received is less than a predefined value; and
   when the time difference is less than the predefined value, performing the process on the first electronic device.

5. The method of claim 1, further comprising:
   determining whether identification data corresponding to the second electronic device conforms to predefined identification data in the first electronic device; and
   when the identification data corresponding to the second electronic device conforms to the predefined identification data in the first electronic device, accepting the connection from the second electronic device, and receiving the motion information from the second electronic device.

6. The method of claim 1, wherein the motion information comprises a variation of a velocity, a displacement, or heading information generated in a predefined interval in which the motion occurred.

7. The method of claim 1, wherein the process comprises an unlocking process for the first electronic device, an operational process for a user interface in the first electronic device, or an activation process for an application in the first electronic device.

8. A system for process management based on motion detection for use in a first electronic device, comprising:
   an input obtaining unit receiving a touch input;
   a reception unit receiving motion information from a second electronic device, wherein at least one first sensor detects a motion of the second electronic device to generate the motion information; and
   a processing unit determining whether the received touch input conforms to a predefined pattern in the first electronic device, determining whether the received motion information conforms to the touch input when the received touch input conforms to the predefined pattern in the first electronic device, and performing a process on the first electronic device when the motion information conforms to the received touch input, wherein an association setting between the touch input for the first electronic device and the motion of the second electronic device is preset in the first electronic device, and the determination of whether the motion information conforms to the touch input is performed by looking up a table, and the motion information of the second electronic device conforms to the touch input of the first electronic device when an item set in the association setting is present.

9. The system of claim 8, wherein the input comprises a track corresponding to a movement of an object on an input unit of the first electronic device, a track detected by an input unit of the first electronic device, a trigger of at least one touch input unit of the first electronic device, or a trigger of an event in the first electronic device.

10. The system of claim 8, wherein a motion of the first electronic device is detected by at least one second sensor to generate the touch input.

11. The system of claim 8, wherein the processing unit further determines whether a time difference between a time when the touch input is received and a time when the motion information is received is less than a predefined value, and performs the process on the first electronic device when the time difference is less than the predefined value.

12. The system of claim 8, wherein the processing unit further determines whether identification data corresponding to the second electronic device conforms to predefined identification data in the first electronic device, and accepts the connection from the second electronic device and receives the motion information from the second electronic device when the identification data corresponding to the second electronic device conforms to the predefined identification data in the first electronic device.

13. The system of claim 8, wherein the motion information comprises a variation of a velocity, a displacement, or heading information generated in a predefined interval in which the motion occurred.

14. The system of claim 8, wherein the process comprises an unlocking process for the first electronic device, an operational process for a user interface in the first electronic device, or an activation process for an application in the first electronic device.

15. A non-transitory machine-readable storage medium comprising a computer program, which, when executed, causes a device to perform a method for process management based on motion detection for use in a first electronic device, wherein the method comprises:

receiving a touch input;

receiving motion information from a second electronic device, wherein at least one first sensor detects a motion of the second electronic device to generate the motion information;

determining whether the received touch input conforms to a predefined pattern in the first electronic device;

determining whether the motion information conforms to the received touch input when the received touch input conforms to the predefined pattern in the first electronic device; and when the motion information conforms to the received touch input, performing a process on the first electronic device, wherein an association setting between the touch input for the first electronic device and the motion of the second electronic device is preset in the first electronic device, and the determination of whether the motion information conforms to the touch input is performed by looking up a table, and the motion information of the second electronic device conforms to the touch input of the first electronic device when an item set in the association setting is present.

* * * * *